United States Patent [19]
Piontek et al.

[11] Patent Number: 5,715,549
[45] Date of Patent: Feb. 10, 1998

[54] SINK ASSEMBLY ENCLOSED WITHIN DRAWER

[75] Inventors: David Piontek; Walter Kemmer, both of Canton, Mich.

[73] Assignee: ASC Incorporated, Southgate, Mich.

[21] Appl. No.: 689,963

[22] Filed: Aug. 16, 1996

[51] Int. Cl.⁶ .............................. B60R 15/02; A47K 1/00
[52] U.S. Cl. ..................... 4/626; 4/630; 4/638; 4/678; 4/DIG. 2
[58] Field of Search .................... 4/516, 549, 554, 4/625, 626, 630, 638, 643, 650, 653, 678, DIG. 2; 312/228

[56] References Cited

U.S. PATENT DOCUMENTS

| | | | |
|---|---|---|---|
| 29,493 | 8/1860 | Iske | 4/630 X |
| 102,002 | 4/1870 | Hedell | 4/630 X |
| 136,802 | 3/1873 | Wyttenbach | 4/630 X |
| 459,079 | 9/1891 | Wicks | 4/626 |
| 1,342,843 | 6/1920 | Clifford | 4/626 |
| 1,779,037 | 10/1930 | Elsey | 4/626 X |
| 1,982,117 | 11/1934 | Murie | 4/630 |
| 2,315,233 | 3/1943 | Tully et al. | 4/630 |
| 2,315,927 | 4/1943 | Brack | 4/630 |
| 2,547,613 | 4/1951 | Bailey | 4/626 X |
| 2,814,809 | 12/1957 | Boyle | 4/630 |
| 3,537,110 | 11/1970 | Horie | 4/630 |
| 3,694,826 | 10/1972 | Pugh | 4/516 |
| 3,983,583 | 10/1976 | Herman et al. | 4/630 X |
| 4,072,157 | 2/1978 | Wines et al. | 4/630 X |

FOREIGN PATENT DOCUMENTS

| | | | |
|---|---|---|---|
| 0086271 | 11/1921 | Austria | 4/630 |
| 1054988 | 2/1954 | France . | |
| 129992 | 10/1932 | Germany | 4/630 |
| 576646 | 5/1933 | Germany | 4/630 |
| 168412 | 6/1951 | Germany | 4/630 |
| 5106253 | 4/1993 | Japan . | |
| 0258187 | 9/1926 | United Kingdom | 4/626 |

OTHER PUBLICATIONS

Brochure, Peterbilt, "Ultrasleeper", Mar. 1996, 4 pgs.
"Overdrive" Magazine, Jul. 1996 issue, p. 32.

Primary Examiner—Robert M. Fetsuga
Attorney, Agent, or Firm—Harness, Dickey & Pierce, P.L.C.

[57] ABSTRACT

Provided is a self-contained water supply system for over-the-road trucks. More specifically, the present invention includes a sink assembly stowable within a cabinet assembly which is capable of providing a self contained supply of water from a supply tank located within the interior of the vehicle. The sink assembly further includes a basin for collecting water and draining the waste water into a drain tank also contained within the vehicle. The sink assembly including the basin and the faucet assembly are disposed within a drawer assembly which is stowable within a cabinet assembly located in the interior of the vehicle.

7 Claims, 2 Drawing Sheets

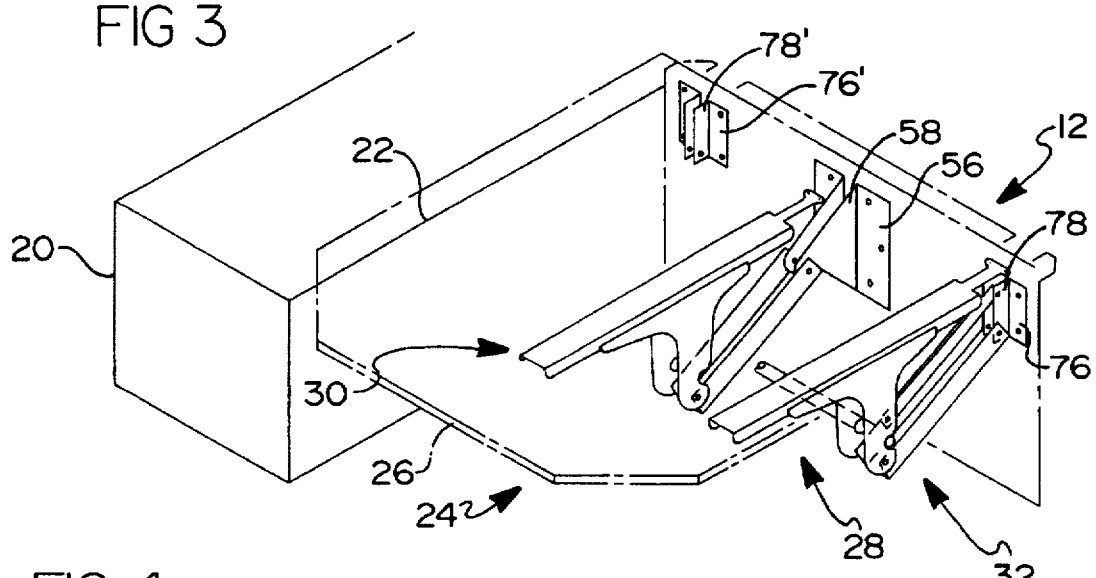
FIG 3
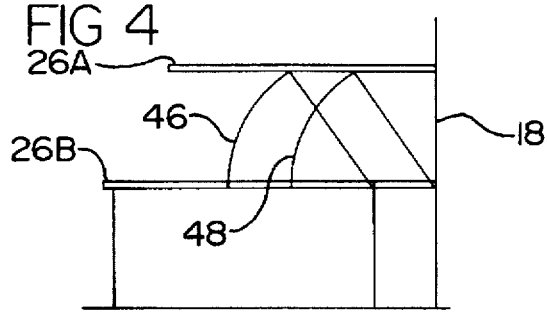
FIG 4
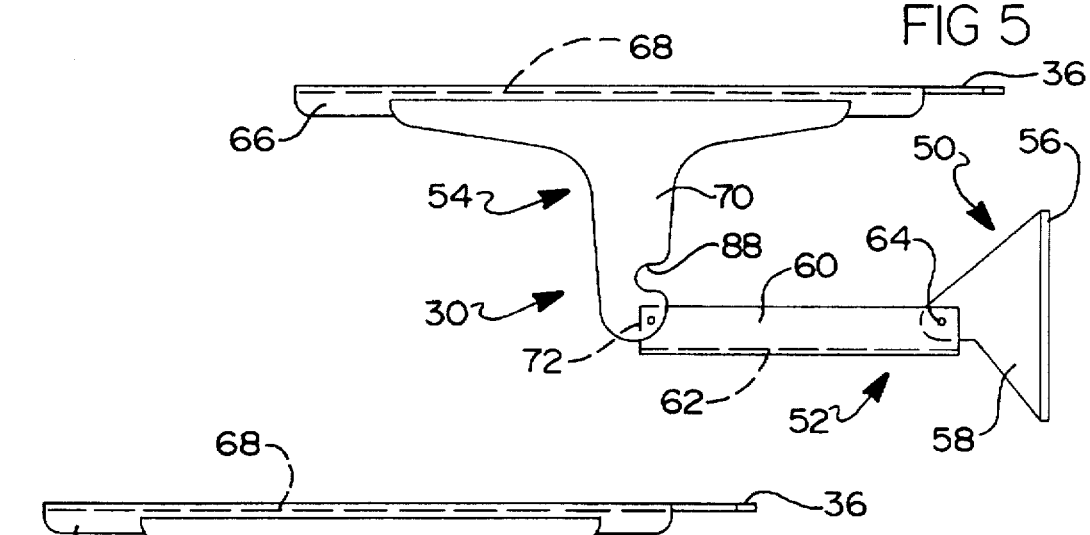
FIG 5
FIG 6

SINK ASSEMBLY ENCLOSED WITHIN DRAWER

BACKGROUND AND SUMMARY OF THE INVENTION

This invention relates generally to a self-contained water system for use in over-the-road trucks, and more particularly to a cabinet assembly having a sink assembly located within a drawer and positionable from a stored position to a use position for providing a self-contained supply of water within the interior of the vehicle cab.

Large over-the-road trucks, or long-haul tractor trailers have long been designed with extended cab areas into which beds may be placed so that the drivers have a place to sleep or relax during brakes in driving. In addition to providing sleeping accommodation, it is desirable to provide as many other comfort features within the vehicle cab since drivers often spend long hours in vehicles of this type. However, space is extremely limited in the cab. Therefore, it is desirable to provide a compact and convenient manner for providing these comfort features, while maximizing the useable storage space therein.

The present invention is directed to a sink assembly disposed within a drawer assembly of a cabinet located within the vehicle interior of an over-the-road truck. In this way, access to the sink may be provided by withdrawing the drawer assembly from the cabinet assembly. Likewise, when the sink assembly is not in use, it may be stowed within the cabinet assembly to provide additional room for movement around the cab interior. The sink assembly of the present invention includes a drawer assembly movably mounted within a cabinet assembly, the drawer assembly having a sink basin and faucet located therein. A water supply tank is coupled to the faucet by way of a water supply line. Likewise, a drain tank is coupled to the basin by way of a drain line. Furthermore, the faucet assembly is positionable relative to the basin for providing improved access to the faucet outlet while minimizing the drawer space required for the sink assembly.

These and other advantages and features of the present invention will become apparent to those skilled in the art from the following written description and appended claims taken in conjunction with the accompanying drawings.

BRIEF DESCRIPTION OF THE DRAWINGS

FIG. 3 is an exploded perspective view of the drawer and sink assemblies of the present invention; and FIG. 4 is a cross-sectional view of the drawer and sink assemblies of the present invention.

DETAILED DESCRIPTION OF THE PREFERRED EMBODIMENT

The present invention provides a self-contained water supply which is adaptable to be used in the interior of numerous types of vehicles such as over-the-road trucks, recreational vehicles, marine crafts, railroad cars, air crafts and the like. While shown embodied in a sink assembly adapted to a cab of an over-the-road truck, one will appreciate the present invention is not so limited in application.

Figure 1:
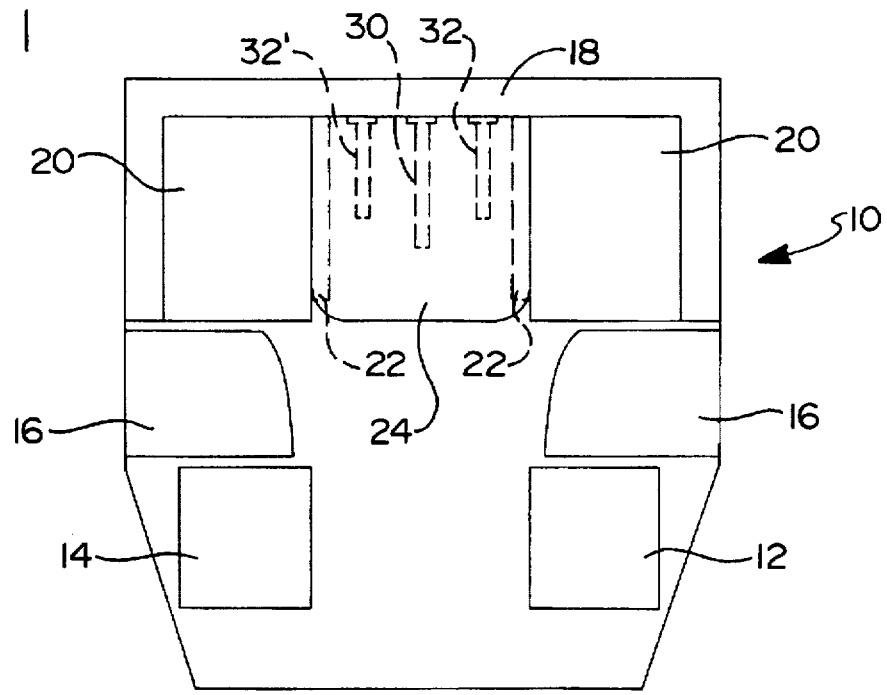
FIG. 1 is a schematic representation of the interior of an over-the-road truck cab equipped showing the relative location of various interior components including the present invention.
Figure 2:
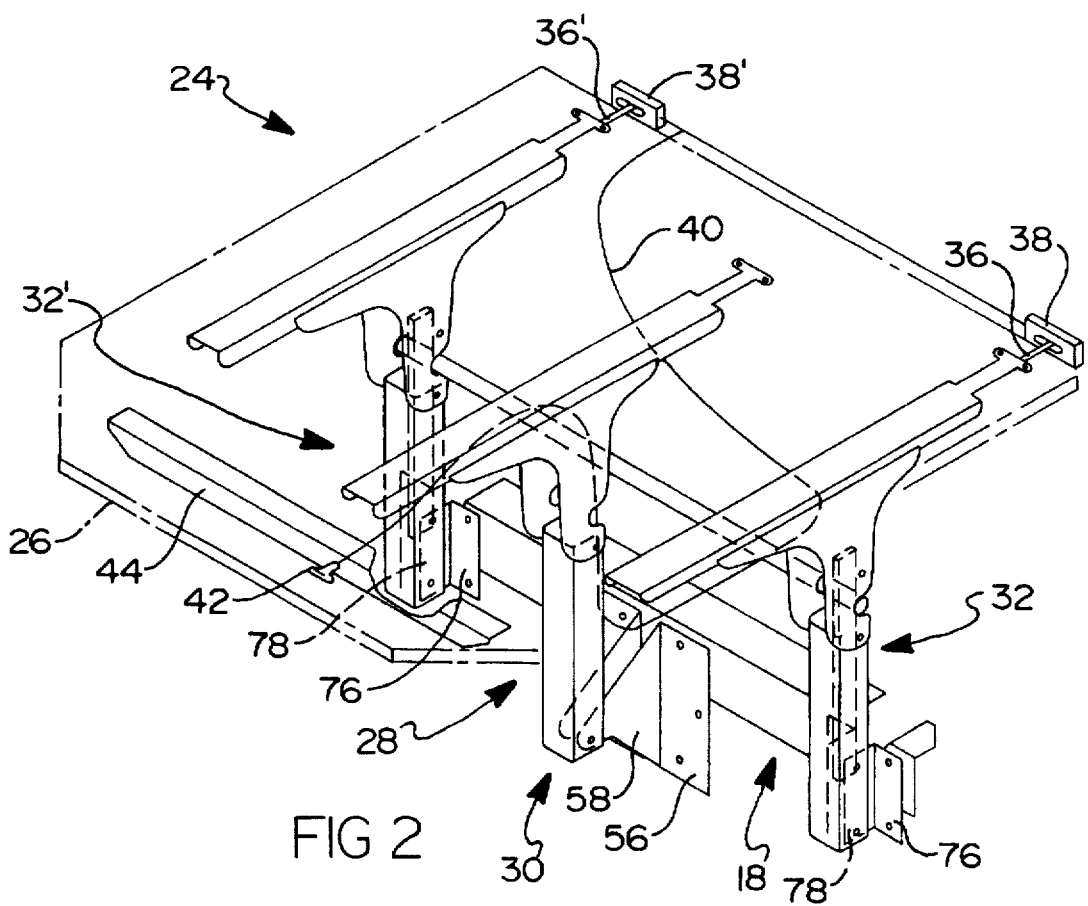
FIG. 2 is a perspective view of a cabinet assembly having a drawer assembly in an extended position to receive the sink assembly.

Referring now to FIG. 1, truck cab 10 is schematically represented and includes driver seat 12, passenger seat 14, cabinet assemblies 16 and 18 located behind driver seat 12 and passenger seat 14 respectively, bench seats 20, table assembly 22, foldable bunk assembly 24 and ladder assembly 26. Sink assembly 28 of the present invention is located within cabinet assembly 16 which further includes upper cabinet 30, refrigerator 32, and drawer assembly 34 as best seen in FIG. 2. More specifically, sink assembly 28 includes basin 36 and faucet 38 disposed within drawer assembly 34 which is positionable within cabinet assembly 16 from a retracted, stored position to an extended use position. As best seen in FIGS. 2 and 4, the available space for sink assembly 28 is extremely limited by upper cabinet unit 30 and refrigerator unit 32. Therefore, sink assembly 28 is adapted to occupy a minimum volume as discussed in further detail below.

Referring again to FIG. 1, supply tank 40 and pump 42 are disposed within bench seat 20 and provide means for supplying water to sink assembly 28 by way of supply line 44. Likewise, drain tank 46 is located within bench seat 20 and provides means for storing drain or waste water from sink assembly 28 via drain line 48.

Referring now to FIGS. 3 and 4, drawer assembly 34 includes drawer front 50, a pair of drawer sides 52, drawer back 54 and drawer countertop 56 which are interconnected by appropriate joints to form drawer assembly 34. A pair of drawer slides 58 are secured to an outboard surface of drawer sides 52 and operably couple drawer assembly 34 to wall portion 60 of cabinet assembly 16. In this manner, drawer assembly 34 is slidably positionable within cabinet assembly 16 in a manner well known. Cabinet assembly 16 further includes drawer stop for defining the retracted or inwardmost position of drawer assembly 34 with respect to cabinet assembly 16. Drawer countertop 56 has a basin aperture 64 formed therein for receiving basin 36 which is secured to drawer countertop 56 in a manner well known in the art. Likewise, drawer countertop 56 has faucet aperture 66 formed therethrough for receiving faucet stem 68 and pump wires 70 therethrough.

As best seen in FIGS. 1 and 4, supply tank 40 is coupled to faucet 38 by way of supply line 44. Pump wires 70 interconnect pump 42 with faucet switch 72 for activating and deactivating pump 42. An additional feature of faucet 38 is the ability of faucet nozzle 74 to be rotatably positionable about axis P (indicated in FIGS. 3 and 4) for varying the height and direction of the output of water from faucet 38, as shown by reference numerals 74 and 74' in FIG. 4. While a variety of faucet assemblies may be adapted for use in the present invention, a faucet assembly from SHURFLO, Model No. 94-009-01, is presently preferred for use in the present invention.

With continued reference to FIGS. 3 and 4, sink assembly 28 further includes basin 36 having a rim portion 76 extending over drawer countertop 56 to position and support basin 36 thereon. Bowl portion 78 extends downwardly from rim portion 76 into the interior volume of drawer assembly 34 and terminates at flange portion 80 which extends downwardly from bowl portion 78. A trap assembly 82 is releasably secured to basin flange 80 and has a drain nipple 84 extending radially therefrom for coupling with drain line 48 as best seen in FIG. 4. A plurality of fasteners 86 secure trap assembly 82 to basin 36. This enables trap assembly 82 to be removed from basin 36 for cleaning when necessary. While a variety of sink basins may be readily adapted for use in the present invention, a stainless steel sink basin provide by STERLING is presently preferred.

As discussed above, supply line 44, drain line 48 and pump wires 70 are coupled to sink assembly 28 and extend rearwardly therefrom to supply tank 40, drain tank 46 and pump 42 respectively. Biasing mechanism 88 is interconnected between a wall portion of cabinet 16 to facilitate retraction of supply line 44, drain line 48 and pump wire 70 into cabinet assembly 16 when drawer assembly is positioned to its stored position. More specifically, biasing mechanism 88 includes tie 90 capturing supply line 44, drain line 48 and wire 70, and further coupled to spring 92. The end of spring 92 opposite tie 90 is coupled to a wall portion of cabinet 16 by way of eyelet 94, as best seen in FIG. 4.

With continued reference to FIGS. 1–4, the operation of sink assembly 28 of the present invention will now be described. In the stowed position, sink assembly 28 is contained within drawer assembly 34 which is fully retracted into cabinet 16. Spring member 92 is in a relaxed state, and faucet spout 74 is positioned in its downwardmost position. Drawer face 50 engages drawer stop 62 thereby providing a flush cabinet face surface of cabinet assembly 16. When it is desirable to utilize the self-contained supply of water, the drawer assembly 34 is extended from cabinet assembly 16, thereby revealing sink assembly 28. As drawer assembly 34 is extended spring 92 elongates thereby providing the necessary length for supply line 44, drain line 48 and pump wire 70. Once in the extended position, faucet spout 74 can be rotated upwardly to provide ready access thereto. Switch 72 is rotated thereby activating pump 42 which supplies water from water supply tank 40 through pump 42 and supply line 44 into and out of faucet spout 74. Excess water is drained from basin 36 through trap 82 and drain line 48 and ultimately is stored in drain tank 46. When the user is finished with sink assembly 28, pump switch 72 is counter rotated thereby disabling pump 42 to turn off the supply of water. Drawer assembly 34 is pushed inwardly, so as to conceal sink assembly 28 within cabinet assembly 16. As drawer assembly 34 is pushed inwardly, spring 92 retracts, thereby pulling water supply line 44, drain line 48 and pump wire 70 to the back of cabinet 16.

While it is apparent that the preferred embodiment of the present invention disclosed herein are well calculated to provide the advantages and features above stated, it will be appreciated that the invention is susceptible to modifications, variations and change without departing from the proper scope or fair meaning of the subjoined claims.

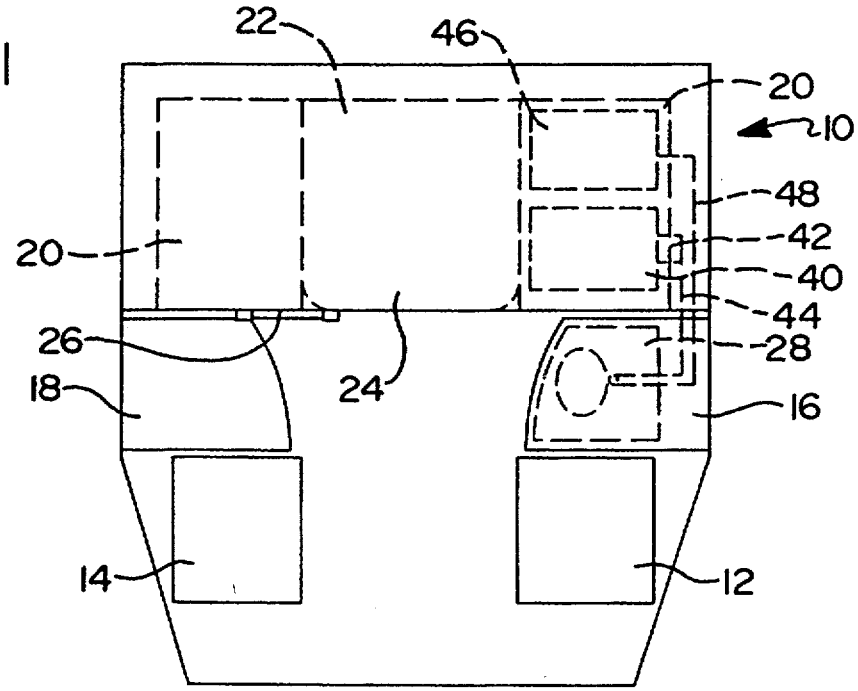

We claim:

1. A stowable sink assembly comprising:

a cabinet assembly;

a drawer disposed within said cabinet assembly having a drawer slide mechanism for enabling said drawer to be slidably positionable with respect to said cabinet assembly, said drawer including a countertop portion disposed therein;

a sink basin supported by said countertop portion and having a drain trap;

a faucet assembly extending from said countertop;

a supply supply tank in fluid communication with said faucet assembly for supplying fluid from said tank to said faucet assembly; and a drain tank in fluid communication with said drain trap; whereby said sink basin and said faucet assembly are fully enclosed within said cabinet assembly when said drawer is in a retracted position, and said basin and said faucet assembly are exposed and accessible when said drawer assembly is in an extended, use position.

2. The sink assembly as set forth in claim 1, wherein said supply tank and said drain tank are located outside a volume defined said cabinet assembly.

3. The sink assembly as set forth in claim 2 further comprising a supply line interconnected between said supply tank and said faucet assembly; and a drain line interconnected between said drain trap and said drain tank.

4. The sink assembly as set forth in claim 3 and further comprising a pump assembly interdisposed between said faucet assembly and said supply tank and in fluid communication with said supply line for pumping fluid from said supply tank to said faucet assembly.

5. The sink assembly as set forth in claim 4, wherein said faucet assembly further comprises a pump switch for activating and deactivating said pump.

6. The sink assembly as substantially set further in claim 5 further comprising a biasing mechanism interconnected between said cabinet assembly and said supply and drain lines.

7. The sink assembly as set forth in claim 4, wherein said faucet assembly further includes a faucet spout pivotably positionable with respect to said basin.

* * * * *

UNITED STATES PATENT AND TRADEMARK OFFICE
CERTIFICATE OF CORRECTION

PATENT NO. : 5,715,549

DATED : February 10, 1998

INVENTOR(S) : Piontek et al

It is certified that error appears in the above-identified patent and that said Letters Patent is hereby corrected as shown below:

The title page, showing the illustrative figure, should be deleted and substitute therefor the attached title page.

In the drawings, Figs. 1, 2, 3 and 4 should be deleted and substitute therefor Figs. 1, 2, 3 and 4, as shown on the attached pages.

Signed and Sealed this

Thirteenth Day of October 1998

*Attest:*

BRUCE LEHMAN

*Attesting Officer*   *Commissioner of Patents and Trademarks*

United States Patent [19]

Piontek et al.

[11] Patent Number: 5,715,549
[45] Date of Patent: Feb. 10, 1998

[54] SINK ASSEMBLY ENCLOSED WITHIN DRAWER

[75] Inventors: David Piontek; Walter Kemmer, both of Canton, Mich.

[73] Assignee: ASC Incorporated, Southgate, Mich.

[21] Appl. No.: 689,963

[22] Filed: Aug. 16, 1996

[51] Int. Cl.⁶ .................. B60R 15/02; A47K 1/00
[52] U.S. Cl. .................. 4/626; 4/630; 4/638; 4/678; 4/DIG. 2
[58] Field of Search ............... 4/516, 549, 554, 4/625, 626, 630, 638, 643, 650, 653, 678, DIG. 2; 312/228

[56] References Cited

U.S. PATENT DOCUMENTS

| | | | |
|---|---|---|---|
| 29,493 | 8/1860 | Iske | 4/630 X |
| 102,002 | 4/1870 | Hedell | 4/630 X |
| 136,802 | 3/1873 | Wynenbach | 4/630 X |
| 459,079 | 9/1891 | Wicks | 4/626 |
| 1,342,843 | 6/1920 | Clifford | 4/626 |
| 1,779,037 | 10/1930 | Elsey | 4/626 X |
| 1,982,117 | 11/1934 | Mune | 4/630 |
| 2,315,233 | 3/1943 | Tully et al. | 4/630 |
| 2,315,927 | 4/1943 | Brack | 4/630 |
| 2,547,613 | 4/1951 | Bailey | 4/626 X |
| 2,814,809 | 12/1957 | Boyle | 4/630 |
| 3,537,110 | 11/1970 | Hodie | 4/630 |
| 3,694,826 | 10/1972 | Pugh | 4/516 |
| 3,983,583 | 10/1976 | Herman et al. | 4/630 X |
| 4,072,157 | 2/1978 | Wines et al. | 4/630 X |

FOREIGN PATENT DOCUMENTS

| | | | |
|---|---|---|---|
| 0086271 | 11/1921 | Austria | 4/630 |
| 1054988 | 2/1954 | France | |
| 129992 | 10/1932 | Germany | 4/630 |
| 576646 | 5/1933 | Germany | 4/630 |
| 168412 | 6/1951 | Germany | 4/630 |
| 5106253 | 4/1993 | Japan | |
| 0258187 | 9/1926 | United Kingdom | 4/626 |

OTHER PUBLICATIONS

Brochure, Peterbilt, "Ultrasleeper", Mar. 1996, 4 pgs.
"Overdrive" Magazine, Jul. 1996 issue, p. 32.

Primary Examiner—Robert M. Fetsuga
Attorney, Agent, or Firm—Harness, Dickey & Pierce, P.L.C.

[57] ABSTRACT

Provided is a self-contained water supply system for over-the-road trucks. More specifically, the present invention includes a sink assembly stowable within a cabinet assembly which is capable of providing a self contained supply of water from a supply tank located within the interior of the vehicle. The sink assembly further includes a basin for collecting water and draining the waste water into a drain tank also contained within the vehicle. The sink assembly including the basin and the faucet assembly are disposed within a drawer assembly which is stowable within a cabinet assembly located in the interior of the vehicle.

7 Claims, 2 Drawing Sheets

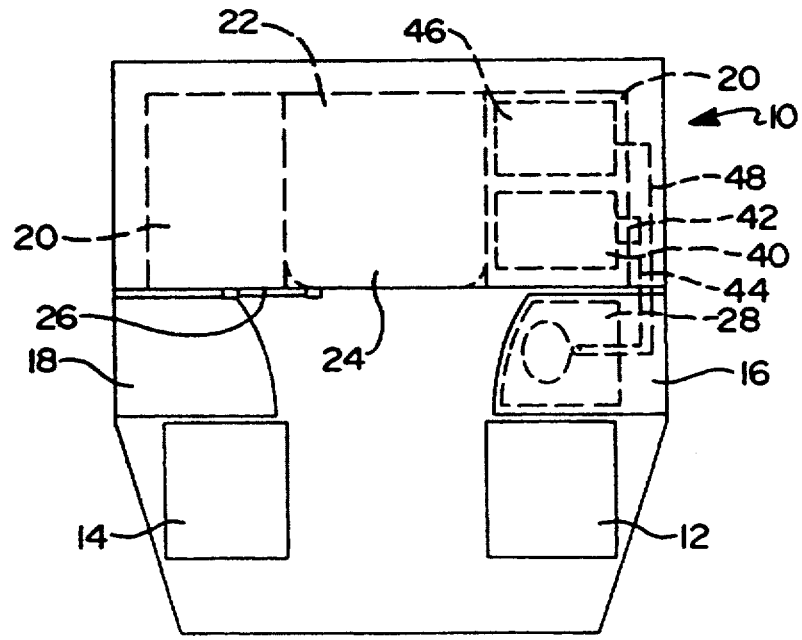

UNITED STATES PATENT AND TRADEMARK OFFICE
CERTIFICATE OF CORRECTION

PATENT NO. : 5,715,549
DATED : February 10, 1998
INVENTOR(S) : David Piontek et al.

It is certified that error appears in the above-identified patent and that said Letters Patent is hereby corrected as shown below:

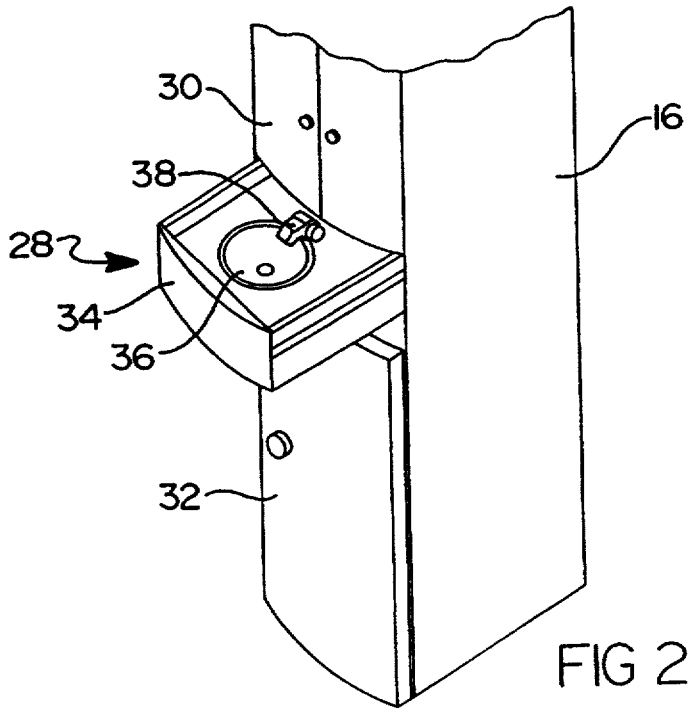

FIG 2

UNITED STATES PATENT AND TRADEMARK OFFICE
CERTIFICATE OF CORRECTION

PATENT NO. : 5,715,549  
DATED : February 10, 1998  
INVENTOR(S) : David Piontek et al.

Page 4 of 7

It is certified that error appears in the above-identified patent and that said Letters Patent is hereby corrected as shown below:

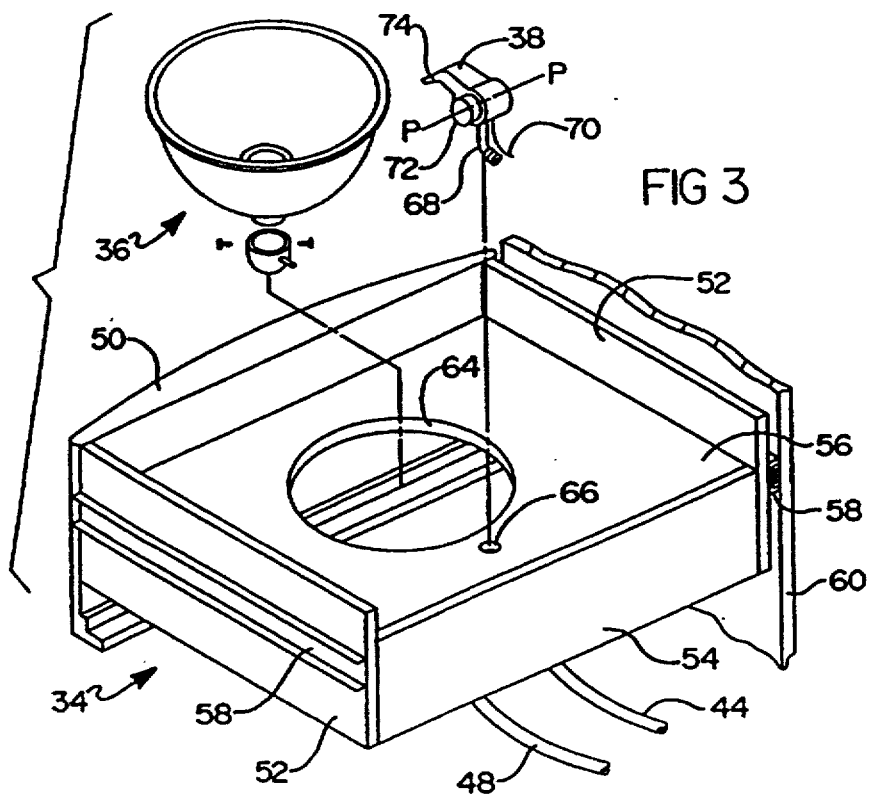

UNITED STATES PATENT AND TRADEMARK OFFICE
CERTIFICATE OF CORRECTION

PATENT NO. : 5,715,549　　　　　　　　　　　　　　Page 5 of 7
DATED     : February 10, 1998
INVENTOR(S) : David Piontek et al.

It is certified that error appears in the above-identified patent and that said Letters Patent is hereby corrected as shown below:

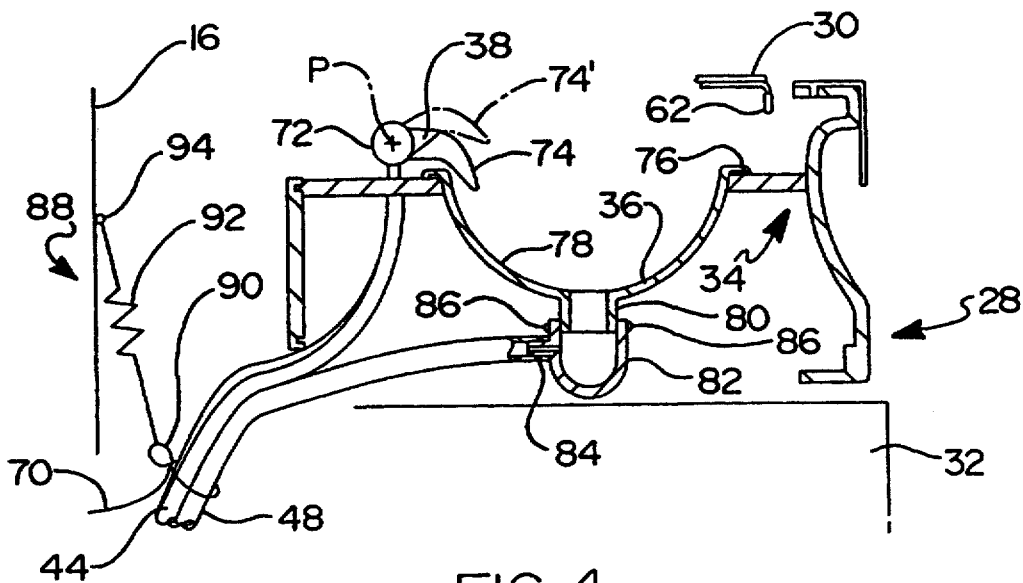

FIG 4

UNITED STATES PATENT AND TRADEMARK OFFICE
CERTIFICATE OF CORRECTION

PATENT NO. : 5,715,549
DATED : February 10, 1998
INVENTOR(S) : Piontek et al.

It is certified that error appears in the above-identified patent and that said Letters Patent is hereby corrected as shown below:

Figures 5 and 6 of the drawings should be deleted.

Column 2, line 38 "Ukewise" should be --Likewise--.

Column 2, line 66 "provide" should be --provided--.

Column 4, line 13 before "tank" delete --supply--.

Column 4, line 14 before "tank" insert --supply--.

Column 4, line 24 after "defined" insert --by--.

Column 4, line 38 "further" should be --forth--.

Column 4, line 39 "5" should be --3--.

UNITED STATES PATENT AND TRADEMARK OFFICE
CERTIFICATE OF CORRECTION

PATENT NO. : 5,715,549
DATED : February 10, 1998
INVENTOR(S) : David Piontek et al.

It is certified that error appears in the above-identified patent and that said Letters Patent is hereby corrected as shown below: